ADJUSTABLE CAM STRUCTURE

Filed Aug. 3, 1964

INVENTOR
JAMES S. NEAL

BY Thomas W. Ehrmann

ATTORNEY

United States Patent Office 3,267,767

Patented August 23, 1966

3,267,767

ADJUSTABLE CAM STRUCTURE

James S. Neal, Whitefish Bay, Wis., assignor to Energy Conversion Systems Corporation, Grafton, Wis., a corporation of Wisconsin Filed Aug. 3, 1964, Ser. No. 386,914
11 Claims. (Cl. 74—568)

This invention relates to adjustable cam structures, and particularly to a rotary cam structure having a plurality of integrally formed cam stations spaced along a circular path defined on a control surface and in which the cam stations are individually adjustable to provide either an uninterrupted continuation of the control surface or a discontinuance in the control surface.

An adjustable cam structure in accordance with this invention can be employed as a rotary switch actuator. That is, by mounting the structure on a rotary shaft at the center of the circular path, the cam structure can be used to actuate a switch having an arm that travels over the cam stations as the cam structure is rotated. The switch is actuated whenever its arm encounters a cam station that has been adjusted away from the control surface to form a discontinuance in the control surface.

As a rotary switch actuator, the cam structure of this invention finds particular application in the field of television tuner programming switches. When coupled with the tuner of a television set, the cam structure can be employed in the automatic cycling of the tuner from one channel to the next channel available in the reception area. Specifically, the cam structure may be provided with thirteen spaced cam stations, each representing a VHF channel, and may be arranged to sweep past the arm of a switch which controls a motor that rotates the tuner and, consequently, the cam structure. Those cam stations representing channels over which reception can be had in an area are adjusted to a position where they form discontinuances in the control surface whereby the switch arm is actuated as it travels over each of such cam stations to halt the motor. Thus, if it is desired to change channels, the motor is first started to rotate the tuner and such rotation will continue until the tuner has been positioned at the next available channel at which time the cam structure causes the motor to be stopped. If a channel other than that located is desired the procedure is repeated until the tuner has been positioned at the desired channel.

The cam stations are formed as an integral part of the cam structure and each station comprises a cam element including a slender arm that permits flexing of the element transversely of the control surface, and at least two locking detents to retain the cam element in respective positions where the cam element forms either a continuation of the control surface or a discontinuance thereof. Provision is also made for the flexing of the cam elements by the use of a simple prying tool and the cam structure is preferably formed of a self-hinge material which can be repeatedly flexed without fatigue failure. Accordingly, the cam structure is particularly adaptable for repeated readjustment of the cam stations and adjustments are readily and quickly accomplished. Thus, it is possible for the cam structure to be set for those television channels available in a particular reception area either by the dealer or consumer. Should other channels later become available they may be set on the cam structure and should the television receiver be moved to a different reception area the cam structure may be readjusted for the channels available in the new area.

It is one object of the present invention to provide a cam structure having a plurality of cam stations which are individually adjustable to and from an actuating position.

It is another object of this invention to provide such a cam structure in which the adjustment of the cam stations is easily and quickly accomplished without special tools or skills.

It is also an object of this invention to provide such an adjustable cam structure which can function as a rotary switch actuator and which will give a positive and abrupt actuation to the switch.

It is a further object of this invention to provide an adjustable cam structure having a plurality of cam stations each comprising a cam element that can be flexed between at least two positions and which is positively restrained in the selected position against the force of follower means traversing the cam stations.

It is still another object of this invention to provide a one piece adjustable cam structure, including a plurality of integral cam stations, that is economical to manufacture and may be formed by molding.

The foregoing and other objects of this invention will appear in the description which follows. In the description reference is made to the accompanying drawings which form a part hereof and in which there is shown specific embodiments of the invention. The embodiments will be described in detail to enable those skilled in the art to appreciate their construction and operation. Obviously, other embodiments of the invention may be made and structural changes may be made in the embodiments illustrated without departing from the scope of the invention; consequently, the scope of the invention is best defined by the appended claims.

Figures 1, 2:
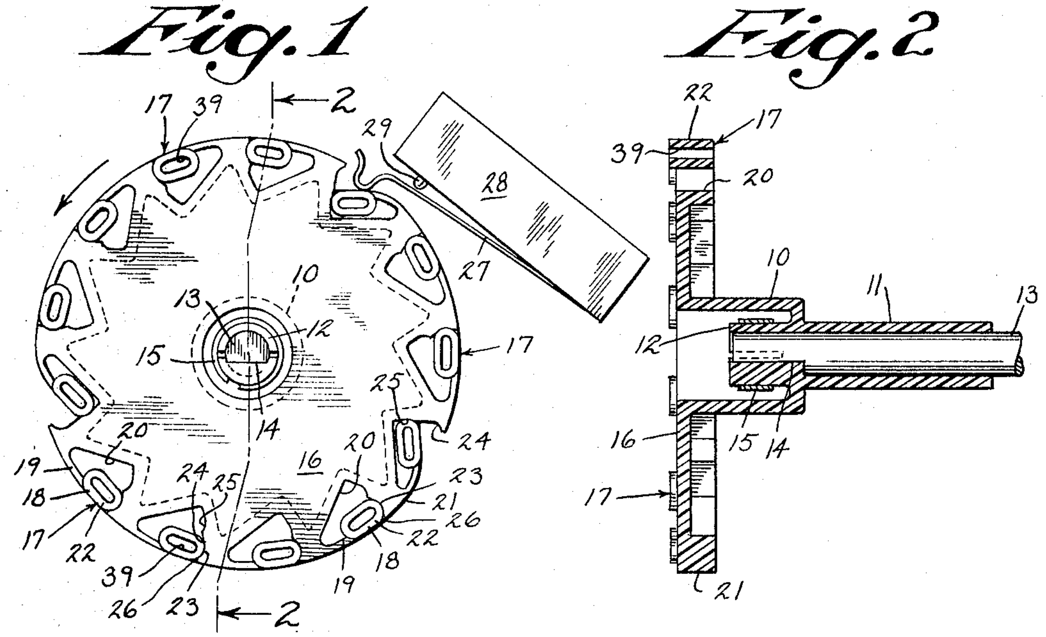
FIG. 1 is a front view in elevation of a first embodiment of the adjustable cam structure in association with a switch to be actuated thereby.
FIG. 2 is a view in vertical section through the cam structure taken in the plane of the line 2—2 of FIG. 1.
Figure 3:
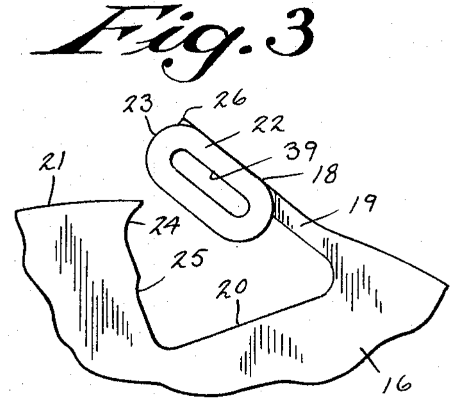
FIG. 3 is an enlarged front view in elevation of a portion of the cam structure of FIG. 1 showing a cam element in a position in which it may be initially formed.

Referring now to the drawings, and specifically to FIGS. 1 through 3, one embodiment of the cam structure utilizes the normally smooth outer periphery of a disc as the control surface, deviations from which perform the camming function. Specifically, the cam structure includes a hub portion 10 formed with an outwardly projecting sleeve 11 and an inwardly projecting sleeve 12 which are adapted to receive a rotary shaft 13. The inner sleeve portion 12 is built up at its bottom to cooperate with a flat 14 provided on the shaft 13 to key the hub portion 10 to the shaft 13. The inwardly projecting sleeve portion 12 is also bifurcated and receives a C-shaped spring clamp 15 that surrounds the inner sleeve portion 12 to axially retain the hub portion 10 on the shaft 13.

A disc portion 16 extends transversely from the hub portion 10. The disc portion 16 is provided with a plurality of equally spaced cam stations designated generally by the reference numeral 17. Each cam station 17 includes a cam element 18 formed in part by a slender arm 19 formed integral with the disc portion 16 and which projects from one side of a recess 20 at the periphery 21 of the disc portion 16. Each cam element 18 also includes an elongated lobe 22 merging with the arm 19 at one end and having a circular cylindrical surface 23 at its other end.

Each recess 20 is formed to provide first and second locking detents for the respective cam elements 18. Such locking detents are defined by first and second detent surfaces 24 and 25, respectively, in a wall of each recess 20 opposing said cam element 18. The first detent surface 24 extends generally radially inwardly from the periphery 21 and has its radially outermost portion formed to mate with the cylindrical surface 23 of the lobe 22. The second detent surface 25 leads radially inwardly of the first detent surface 24 and similarly has its radially outermost portion formed to mate with the cylindrical surface 23 of the lobe 22.

The cam structure is preferably formed by molding from a material such as polypropylene which has the property of self-hinging. That is, structural stresses arising from repeated bending will not result in fatigue failure of the material. Each of the cam elements 18 is preferably formed initially as shown in FIG. 3. That is, the cam elements 18 are formed in a position that is radially outward of the first and second detent surfaces 24 and 25, respectively. When used, however, the cam elements 18 are each flexed and initially positioned to have their lobes 22 engage the first detent surface 24. In this position, the outer surface of each of the cam elements 18 will form an uninterrupted continuation of the outer periphery 21 of the disc portion 16. A small wedge-shaped member 26 is formed integral with each lobe 22 to mate with a stub portion of the first detent surface 24 which is provided to remove interfering portions of the disc portion 16.

The cam structure is shown functioning as a rotary switch actuator. As such, an arm 27 of a switch 28 is adapted to ride over the outer periphery 21 of the disc portion 16. The switch 28 may be of any suitable form and that illustrated includes a button actuator 29 which is depressed by the arm 27 to actuate the switch either to open or close the same. Each of the cam stations 17 may be set to actuate the switch 28 by flexing the respective cam element 18 and placing the same in the radially inner position in which the cylindrical surface 23 of the lobe 22 mates with the second detent surface 25. As seen in FIG. 1, when the cam structure is rotated in a counterclockwise direction by the shaft 13 the switch arm 27 will travel radially inward whenever it encounters a cam element 18 which is in an actuating position and will accordingly open or close the switch 28.

Figure 5:
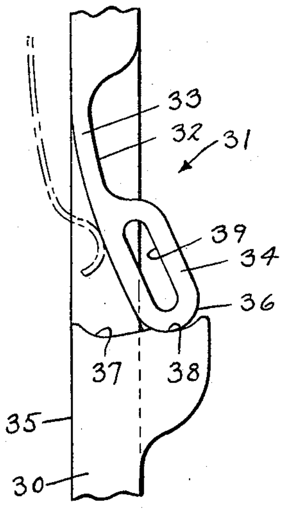
FIG. 5 is a side view showing a cam element of the embodiment of FIG. 4 in an alternate position.
Figure 4:
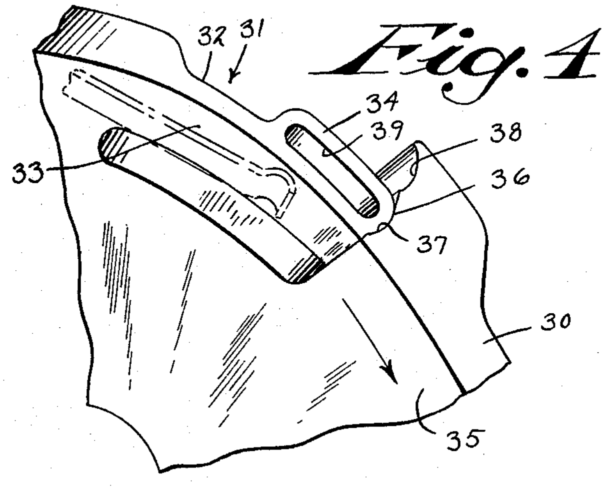
FIG. 4 is a view in perspective of a portion of a second embodiment of an adjustable cam structure according to the present invention.

The second embodiment illustrated in FIGS. 4 and 5 utilizes the normally smooth side surface of a disc as the control surface. Specifically, the disc portion 30 includes integrally formed cam stations 31 spaced along its outer edge. Each of the cam stations 31 again includes a cam element 32 formed of a slender arm 33 and an elongated lobe 34. The arms 33 are of a thickness substantially less than the thickness of the disc portion 30 and the arms 33 are adapted to be flexed transversely of the side control surface 35. The lobes 34 are again provided with a circular cylindrical surface 36 that is adapted to mate with either first or second detent surfaces 37 and 38, respectively. The first detent surface 37 leads transversely inwardly of the disc portion 30 from the side surface 35 and the second detent surface 38 is disposed further inwardly of the disc portion 30 in an enlarged section thereof.

The cam structure of the second embodiment is preferably formed by molding with the cam elements 32 formed initially transversely outwardly of the side surface 35. When the cam elements 32 are positioned in the first detent surfaces 37, the cam elements form an uninterrupted continuation of the side surface 35 to be traversed by the switch arm. When the cam elements 32 are positioned in the second detent surfaces 38, the cam stations 31 form discontinuances of the control surface 35 to actuate the switch.

The lobes 22 and 34 are provided with elongated slots 39 adapted to receive the end of a screwdriver or other simple prying tool to assist in flexing the cam elements 18 and 32. Since the cam elements 18 and 32 are deformed from their normal position when they are engaged with either the respective first or second detent surfaces, the cam elements 18 and 32 mate with the portions of the detent surfaces closest to the respective control surface and the cam elements tend to resist movement away from the respective control surface under the load of the follower means.

It will be appreciated from the foregoing that the cam structure of this invention affords a simple and efficient means for providing adjustable cam follower actuation. The structure lends itself to economical one piece formation by molding. The cam elements are fully and repeatedly adjustable to positions in which they are positively restrained, and adjustment is easily and quickly accomplished.

I claim:

1. An adjustable cam structure comprising: a rotatable cam member having a control surface thereon interrupted by a cam station, said cam station including a cam element formed integral with said cam member and adapted to be flexed transversely of said control surface, and first and second locking detents formed in said cam member opposing said cam element, said cam element being shiftable between a first position in which the cam element is engaged with said first locking detent and forms a continuation of said control surface and a second position in which said cam element is engaged with said second locking detent and provides a discontinuance in said control surface.

2. An adjustable cam structure comprising: a cam member adapted for rotation about a center of rotation, said cam member having a control surface thereon defining a circular path having its center at the center of rotation of said cam member and being interrupted by a plurality of spaced cam stations, each of said cam stations including a cam element formed integral with said cam member and adapted to be flexed transversely of said control surface, and first and second locking detents formed in said cam member opposing said cam element, said cam elements each being shiftable between a first position in which the cam element is engaged with said first locking detent and forms a continuation of said control surface and a second position in which said cam element is engaged with said second locking detent and provides a discontinuance in said control surface.

3. An adjustable cam structure comprising: a disc adapted for rotation about a center of rotation, said disc having a control surface thereon defining a circular path having its center at the center of rotation of said disc, said circular path being interrupted by a plurality of spaced cam stations each comprising a cam element including a slender arm formed integral with said disc and adapted for flexing of said cam element transversely of said control surface, and first and second detent surfaces formed in said disc opposing said cam element and each adapted to mate with and retain said cam element, each of said cam elements forming a continuation of said control surface when engaged with a respective first detent surface and each of said cam elements forming a discontinuance in said control surface when engaged with a respective second detent surface.

4. An adjustable cam structure comprising: a disc adapted for rotation about a center of rotaiton, said disc having a control surface thereon defining a circular path having its center at the center of rotation of said disc, said circular path being interrupted by a plurality of spaced cam stations each comprising a cam element including a slender arm formed integral with said disc and first and second detent surfaces formed in said disc opposing said cam element, each of said detent surfaces adapted to mate with and retain said cam element, said cam elements having a normal position in which they are disposed outwardly of said control surface and each cam element being adapted to be flexed transversely of said control surface to engage with one of said detent surfaces, each of said cam elements forming an uninterrupted continuation of said control surface when engaged with said first detent surface and forming a discontinuance in said control surface when engaged with said second detent surface.

5. An adjustable cam structure comprising: a disc adapted for rotation about its center and having its periphery defining a cylindrical control surface, a plurality of cam stations spaced along said periphery and each comprising a cam element including a slender arm formed integral with said disc and adapted for radial flexing of said cam element, and first and second detent surfaces extending radially inwardly of said disc opposing said cam element, each of said cam elements being shiftable to a first position in which it is engaged with said first detent surface and forms an uninterrupted continuation of said periphery and a second position in which it is engaged with said second detent surface and is disposed radially inwardly of said periphery.

6. An adjustable cam structure comprising: a disc adapted for rotation about its center and having one side forming a control surface defining a circular path having its center at the center of said disc, a plurality of spaced cam stations formed integral with said disc along said circular path and each comprising a cam element including a slender arm adapted for flexing of said cam element transversely of said control surface, and first and second detent surfaces extending transversely into said disc from said control surface and opposing said cam element, each of said cam elements being shiftable between a first position in which it engages said first detent surface and forms a continuation of said control surface and a second position in which it engages said second detent surface and is disposed inwardly of said control surface.

7. An adjustable cam structure comprising: a disc of self-hinge material, means included on said disc for mounting the same on a rotary shaft, said disc having a control surface thereon defining a circular path having its center at the center of rotation of said disc, a plurality of cam stations spaced along said circular path, each of said cam stations comprising a cam element formed integral with said disc and having a slender arm and a lobe merging at one end with said arm, said lobe having an arcuate surface on its other end, a first locking detent extending inwardly of said disc generally transverse to said circular path and adjacent said control surface, and a second locking detent extending further inwardly of said disc from said first locking detent, each of said locking detents having locking surfaces adapted to mate with and releasably retain said lobe, each of said cam elements being adapted to be flexed transversely of said control surface to position said lobe in said first locking detent wherein said cam element forms a continuation of said control surface and alternately to position said lobe in said second locking detent wherein said cam element forms a discontinuance in said control surface.

8. An adjustable cam structure in accordance with claim 7 wherein each of said lobes is provided with a central slot extending transversely of the length of said arm and adapted to receive a prying tool to flex said cam elements.

9. An adjustable cam structure comprising: a disc of a self-hinge material and means included on said disc for mounting the same on a rotary shaft, a plurality of integral cam stations spaced about the periphery of said disc and each comprising a cam element including a slender arm extending from said disc adjacent said periphery and a lobe merging at one end with said arm and having a circular cylindrical surface on its other end, a first locking detent surface disposed radially inwardly from the periphery of said disc, and a second locking detent surface disposed radially inwardly of the first locking detent surface, said detent surfaces being adapted to mate with and releasably retain said lobe, each of said arm and lobe having an uninterrupted outer surface that forms a continuation of the periphery of said disc when said lobe is engaged in said first detent surface and which forms a discontinuance of said periphery when said lobe is engaged in said second detent surface.

10. An adjustable cam structure comprising: a disc of a self-hinge material and means including on said disc for mounting the same on a rotary shaft, a plurality of cam stations spaced in a circular path on a side surface of said disc, each of said cam stations comprising a cam element including a slender arm extending from said disc adjacent said side surface and a lobe merging at one end with said arm and having a circular cylindrical surface on its other end, a first locking detent surface disposed transversely inwardly from said side surface of said disc, and a second locking detent surface disposed transversely inwardly of the first locking detent surface, said detent surfaces being adapted to mate with and releasably retain said lobe, each of said arm and lobe having an uninterrupted outer surface that forms a continuation of said side surface of said disc when said lobe is engaged in said first detent surface and which forms a discontinuance of said periphery when said lobe is engaged in said second detent surface.

11. An adjustable cam structure comprising: a rotatable cam member having a control surface thereon interrupted by a cam station, said cam station including a cam element formed inetgral with said cam member and adapted to be flexed transversely of said control surface, and a locking detent formed in said cam member opposing said cam element, said cam element being shiftable between a position in which said cam element provides a discontinuance in said control surface and an alternate position in which said cam element is engaged with said locking detent and forms a continuation of said control surface.

References Cited by the Examiner

UNITED STATES PATENTS

| | | | |
|---|---|---|---|
| 2,366,573 | 1/1945 | Swallow | 74—568 |
| 2,484,152 | 10/1949 | Burton | 200—38 |
| 3,151,500 | 10/1964 | Kurz | 74—568 |
| 3,161,815 | 12/1964 | Kuhl et al. | 200—38 |
| 3,175,422 | 3/1965 | Braun | 74—568 |

MILTON KAUFMAN, *Primary Examiner.*

W. S. RATLIFF, *Assistant Examiner.*